(12) United States Patent
De Boer

(10) Patent No.: US 6,982,548 B2
(45) Date of Patent: Jan. 3, 2006

(54) SWITCHED MODE POWER SUPPLY WITH DELAY-COMPENSATED CURRENT MODE CONTROL

(75) Inventor: Jan Reinder De Boer, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 37 days.

(21) Appl. No.: 10/497,434

(22) PCT Filed: Nov. 20, 2002

(86) PCT No.: PCT/IB02/04968

§ 371 (c)(1),
(2), (4) Date: Jun. 2, 2004

(87) PCT Pub. No.: WO03/049265

PCT Pub. Date: Jun. 12, 2003

(65) Prior Publication Data

US 2005/0017698 A1   Jan. 27, 2005

(30) Foreign Application Priority Data

Dec. 7, 2001   (EP) .................................. 01204751

(51) Int. Cl.
*G05F 1/44* (2006.01)

(52) U.S. Cl. .................................... 323/282; 363/21.17

(58) Field of Classification Search ............. 363/21.09, 363/21.17, 97; 323/282, 284
See application file for complete search history.

(56) References Cited

U.S. PATENT DOCUMENTS

| 4,415,960 | A | * | 11/1983 | Clark, Jr. ................. 363/21.17 |
| 4,939,632 | A | | 7/1990 | Plagge et al. ................. 363/19 |
| 5,757,629 | A | | 5/1998 | Yntema et al. |
| 6,016,260 | A | * | 1/2000 | Heeringa ................. 363/21.18 |
| 6,430,813 | B2 | * | 8/2002 | Muraguchi et al. ........ 30/43.92 |

* cited by examiner

*Primary Examiner*—Gary L Laxton

(57) ABSTRACT

The invention relates to a switched mode power supply with current mode control, in which an inductive element (7) is connected to a power source (5) by means of a controllable switch (9). During closure of the switch (9) the increasing current through the inductive element (7) is sensed by a current sensor (17) and compared with a reference signal (18). When the signal from the current sensor is equal to the reference signal, the switch (9) is opened. Due to circuitry delays the off-switching of the switch (9) occurs at a higher current level than sensed by the current sensor (17). To compensate for this effect the switched mode power supply has means (16, 19, 15) for generating a compensation signal (Ic*R 15) proportional to the gradient (di/dt) of the current i through the inductive element (7). The circuitry delay can be compensated for by a suitable choice of values of components (15, 19, 16).

5 Claims, 3 Drawing Sheets

SWITCHED MODE POWER SUPPLY WITH DELAY-COMPENSATED CURRENT MODE CONTROL

The present invention relates to a switched mode power supply for applying power to a load via an inductive element. The invention particularly relates to a switched mode power supply with current mode control. Such a power supply is known from U.S. Pat. No. 4,939,632. Energy is accumulated in the inductive element during a first phase, until a predetermined current through the inductive element is reached, after which the inductive element is disconnected from a power source. To this end, a controllable switch is arranged between the power source and the inductive element. A current sensor inserted in the current path of the inductive element generates a sensing signal which is transmitted to a comparator and compared with a reference signal from a reference generator in order to determine whether the predetermined current for disconnection of the inductive element has been reached.

When the predetermined current through the inductive element has been reached, the inductive element is disconnected from the power source and in a second phase the magnetic energy stored in the inductive element is transferred to a load.

It is a drawback of the known switched mode power supply that the instant at which the current through the inductive element is switched off does not coincide with the instant at which the sensing signal and the reference signal are equal. The switching off is delayed owing to a delay in the circuitry of the switched mode power supply. As a result, the current through the inductive element can reach undesirably high values during this delay. In order to accommodate for such undesirable values of the current through the inductive element it is necessary to use large coils or transformers so that the operating frequency must be kept low.

The actual value at which the inductive element is disconnected from the power source often depends on undesirable aspects, such as the voltage level of the power source, the inductance of the inductive element, etc. The known switched mode power supply has a compensation circuit to compensate for the dependency of the switching-off instant on the voltage level of the power source. This is effected by adding a voltage proportional to the voltage of the power source to the reference signal.

The object of the present invention is to provide an improved switched mode power supply in which the above mentioned drawbacks are at least alleviated and/or substantially solved. To this end, a switched mode power supply according to the present invention exhibits the features defined in the appended claim 1.

In the switched mode power supply according to the present invention time delays in the switching off of the inductive element are cancelled by a correction signal which is proportional to the gradient (di/dt) of the current through the inductive element. This correction signal may correct the sensing signal of the current sensor or may correct the reference signal.

Preferred embodiments of the present invention are defined in the appended dependent claims. The embodiment of claim 2 provides a simple and elegant solution to create a gradient-proportional correction signal in series with the reference signal. The embodiment of claim 3 provides the optimal compensation effect at specific values of the compensation resistor, the capacitor and the current gain. The embodiments of claims 4 and 5 suppress capacitive switching transients.

The switched mode power supply according to the invention is eminently suitable for use in consumer appliances with rechargeable batteries, for example, shavers.

These and other aspects of the invention will be elucidated and described with reference to the accompanying drawing in which.

In these drawing Figures components or elements having like function or connotation are denoted by the same references.

Figure 1:
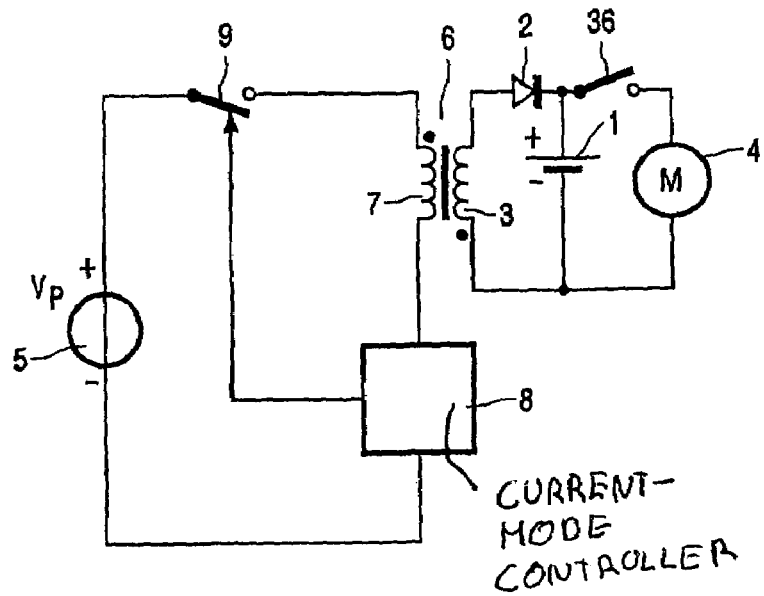
FIG. 1 is a schematic representation of the functioning of a current mode controlled switched mode power supply.

FIG. 1 shows a block diagram of a switched mode power supply with current control. It comprises a series arrangement of a DC power source 5, for example, a rectified AC mains voltage, a controllable switch 9 and an inductive element, in this case being the primary winding 7 of a transformer 6. A load, for example, a rechargeable battery 1, is connected to a secondary winding 3 of the transformer 6 via a diode 2. A DC motor 4 can be connected to the rechargeable battery 1 via a switch 36. During a first phase a current mode controller 8 senses the value of the current through the primary winding 7 and opens the controllable switch 9 when the current reaches a certain threshold level. In a second phase, when the controllable switch is opened, the voltage at the secondary winding 3 of the transformer 6 commutates and makes the diode 6 conductive. The energy stored in the transformer is thus transferred to the load. After some time the current mode controller 8 re-enters the first phase of the next switching cycle.

Figure 2:
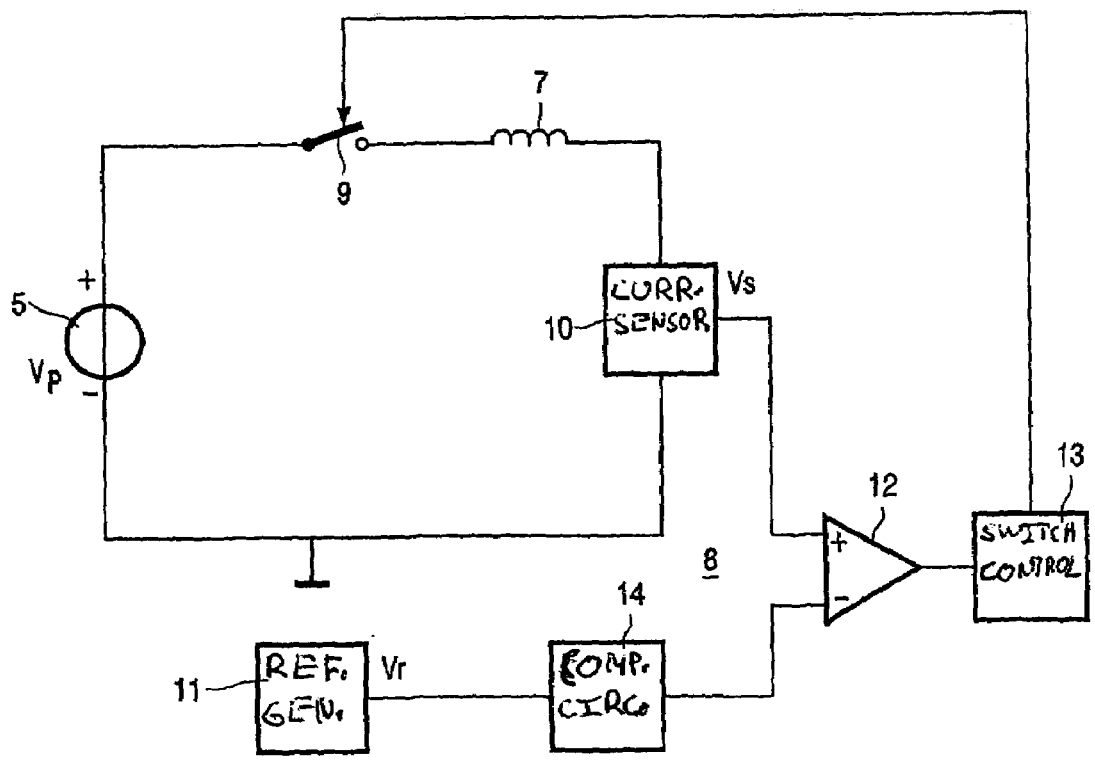
FIG. 2 is a schematic representation of a switched mode power supply according to the present invention.

The current mode controller 8 is shown in more detail in FIG. 2. It comprises a current sensor 10 which senses the current through the primary winding 7. The current mode controller also comprises a reference generator 11 which generates a reference signal Vr that corresponds to the threshold value of the current through the primary winding 7.

The current sensor 10 generates a sensing signal Vs which is substantially proportional to the current through the primary winding 7. The reference signal Vr from the reference generator 11 and the sensing signal Vs are applied to inputs of a comparator 12. In the embodiment shown in FIG. 2 the sensing signal Vs is applied to the positive input terminal of the comparator 12 and the reference signal Vr is applied to a negative input terminal of the comparator 12. The comparator 12 drives a switch control 13, which controls the switching of the controllable switch 9 in response to the comparison of the reference signal Vr and the sensing signal Vs.

In the present embodiment the reference generator 11 and the current sensor 10 both apply a voltage signal to the comparator 12, but any other kind of signal, for example signals in the current domain, is also feasable.

Figure 3:
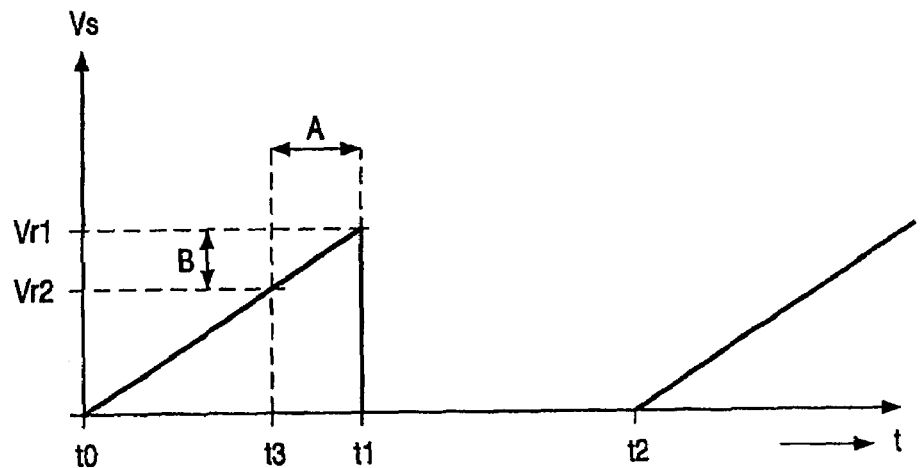
FIG. 3 shows a graph of a sensing signal from a current sensor as shown in FIG. 2.

FIG. 3 shows the voltage Vs of the sensing signal in the configuration according to FIG. 2 as a function of time t. The voltage Vs output by the current sensor increases linearly from the instant t0 until the instant t1 when the sensing signal Vs is equal to the reference voltage signal Vr1 provided by the reference generator 11. At the instant t1 the controllable switch 9 is opened, the primary winding 7 is disconnected from the power source 5 and the sensor voltage Vs drops to zero.

However, the switched mode power supply exhibits circuitry delay times, mainly in the propagation path including the current sensor 10, the comparator 12, the switch control 13 and the controllable switch 9. If no further steps are taken, this propagation delay results in an undesirable delay in the off-switching of the controllable switch 9. As a result the current through the primary winding 7 will, by the time the switch 9 is actually opened, have increased well beyond the desired maximum current threshold value in the period of time that corresponds to the propagation delay.

According to the present invention, as shown in FIG. 2, a compensation circuit 14 is provided to compensate for this effect. The compensation circuit 14 is arranged between the reference generator 1 and the comparator 12 in order to compensate the reference signal for the above described circuitry delay times. It is to be noted that the compensation circuit could equally well be arranged between the sensor and the comparator to obtain the same compensation effect.

In FIG. 3 double arrows A and B illustrate the effect of the circuitry delay times. The double arrow A corresponds to the circuitry delay times which are defined as the period of time elapsing between the instant t3 at which the current through the primary winding 7 passes the desired predetermined threshold value Vr2 and the instant t1 at which the controllable switch 9 is actually opened. The actual switch-off current exceeds the desired switch-off current by a current value denoted by the double arrow B.

The delay can be compensated for by advancing the instant of opening of the controllable switch 9 by a period of time A. The same effect can be obtained by decreasing the reference signal Vr1 by a value denoted by the double arrow B.

According to the invention this decrease is proportional to the gradient (di/dt) of the current through the primary winding 7 to anticipate circuitry delay times.

Figure 4:
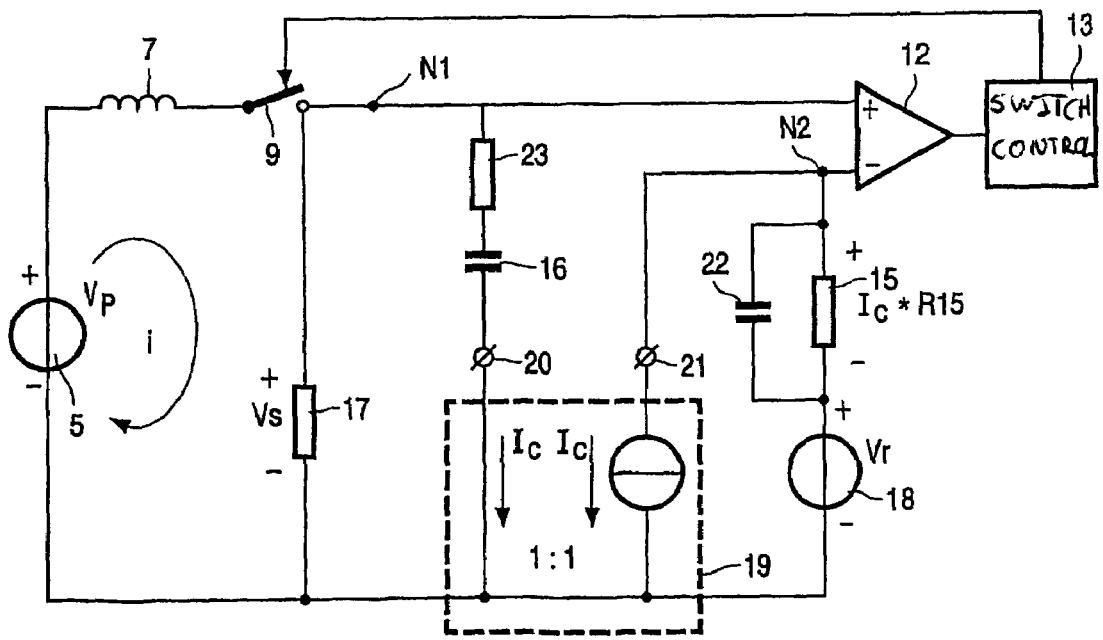
FIG. 4 shows in more detail a configuration of a switched mode power supply according to the present invention.

FIG. 4 shows in more detail an embodiment of the general configuration according to FIG. 2. The current sensor is a sensing resistor 17 connected in series with the controllable switch 9 to form a first node N1. The voltage Vs across the sensing resistor 17 at the first node N1 is the sensing signal Vs which is applied to the positive input terminal of the comparator 12. The reference signal generator 11 is a reference voltage source 18 which applies a reference voltage Vr to the negative input terminal of the comparator 12.

The compensation circuit comprises a compensation resistor 15, a capacitor 16 and a current mirror 19. The compensation resistor 15 is inserted between the reference voltage source 18 and a second node N2 which is coupled to the negative input terminal of the comparator 12. The capacitor 16 is connected between the first node N1 and a current input terminal 20 of the current mirror 19. A current output terminal 21 of the current mirror 19 is connected to the second node N2. An optional resistor 23 can be connected in series with the capacitor 16 and an optional capacitor 22 can be connected in parallel with the compensation resistor 15.

The resistor 17 has a low resistance value and operates as a voltage source, but the voltage at the node N1 may be buffered if the capacitive load caused by capacitor 16 is too high.

The following equation applies to the circuit comprising the power source 5, the primary winding 7, the controllable switch 9 and the sensing resistor 17:

$$Vp = R17*i + L*di/dt \quad (1)$$

In this equation Vp is the voltage supplied by the power source 5, R17 the resistance of the sensing resistor 17, i the current through the primary winding 7, the controllable switch 9 and the resistor 17, and L the inductance of the primary winding 7. In practice the voltage drop R17*i can be neglected with respect to the voltage Vp and the equation simplifies to:

$$Vp = L*di/dt \quad (2)$$

The gradient of the current I, therefore, is constant and equal to Vp/L. The linearly increasing current i causes a likewise linearly increasing voltage Vs across the sensing resistor 17. The current Ic through the capacitor 16 is (ignoring resistor 23) equal to: Ic=C16*dVs/dt. Since Vs=i*R17, this equation can be rewritten as:

$$\begin{aligned} Ic &= C16*R17*\frac{di}{dt} \\ &= C16*R17*\frac{Vp}{L}. \end{aligned} \quad (2A)$$

In other words, the current Ic which flows into the current input terminal 20 of the current mirror 19 is a DC current proportional to the gradient of the current i through the primary winding 7 when the controllable switch 9 is closed. Assuming that the current mirror 19 has a current gain G=1 (indicated in FIG. 4 as 1:1), the current flowing through the current output terminal 21 is also equal to Ic. This current Ic causes a voltage drop Ic*R15 across the compensation resistor 15. In this way the comparator 12 receives at its negative input terminal a compensated reference voltage Vrcomp which is equal to:

$$\begin{aligned} Vrcomp &= Vr - Ic*R15 \\ &= Vr - \left(C16*R17*\frac{di}{dt}\right)*R15 \\ &= Vr - (C16*R15)*\left(R17*\frac{di}{dt}\right) \\ &= Vr - (tRC)*\left(R17*\frac{di}{dt}\right) \\ &= Vr - (tRC)*\frac{dVs}{dt}, \end{aligned} \quad (2B)$$

wherein tRC=R15*C16

When the desired value of the current through the primary winding 7 at which the controllable switch 9 is to be switched is designated Isw, this desired value Isw should comply with the following equation:

$$Isw = Vsw/R17 \quad (3)$$

Vsw is the value of the sensing voltage Vs across the sensing resistor 17 at which the controllable switch 9 is to be switched. However, as a result of circuitry delay times the real switching value of the current through the primary winding 7 can be written as:

$$Isw = Vsw/R17 + tdI*di/dt \quad (4)$$

In this equation tdl is the circuitry delay time. Substitution of the equation (2) in the equation (4) gives the following equation:

$$Isw = Vsw/R17 + tdl * Vp/L \quad (5)$$

From the equation 5 it follows that the actual current Isw at which the controllable switch 9 is switched deviates from the desired switch current as defined in formula 3. The deviation amounts to tdl*Vp/L, in which Vp is the voltage of the power source 5. This means that the actual switch-off current not only deviates from the desired switch-off current as a result of the delay times, but is also dependent on the inductance L of the primary winding 7 and the voltage Vp provided by the power source 5. This is highly undesirable.

Due to the compensation circuit the actual voltage across the sensing resistor 17 is compared with the compensated reference signal Vrcomp. Using the result of the equation (2B), the equation (4) can be rewritten as:

$$Isw = \left(Vr - (tRC) * \left(R17 * \frac{di}{dt}\right)\right) \bigg/ R17 + tdl * \frac{di}{dt} \quad (6)$$

$$= \frac{Vr}{R17} - tRC * \frac{di}{dt} + tdl * \frac{di}{dt}$$

$$= \frac{Vr}{R17} + (tdl - tRC) * \frac{di}{dt}.$$

The circuitry delay tdl is compensated by an amount tRC. By making the time constant tRC=R15*C16 equal to the circuitry delay tdl, the switch-off current Isw becomes equal to the desired Isw=Vr/R17 and the voltage Vp of the power source 5 and the inductance L of the primary winding 7 no longer have an effect on the instant at which the current is switched off. Compensation is thus accomplished for fluctuations in the power source voltage. If the current gain G of the current mirror 19 is not equal to 1, the voltage drop across the compensation resistor 15 is equal to Ic*G*R15. The effect of the compensation resistor 15 is then G times as large.

The effect of circuitry delay times can thus be decreased or even eliminated by an appropriate choice of the resistance R15, the capacitance C16 and the gain G. This enables higher switching frequencies and greater miniaturization of the magnetic components. The solution provided by the present invention is simple and easily applicable.

The optional resistor 23 and the capacitor 22 suppress capacitive switching transients. To find the optimum compensation the value R15*C16 can be incremented continuously or stepwise, for example, by varying the resistance R15 of the compensation resistor 15 by means of a manually operated potentiometer or a DC controlled potentiometer.

It is to be noted that the present invention is not limited to a switched mode power supply with a transformer. The principles are also applicable to switched mode power supplies with a simple inductive element (buck and boost converters). The compensation signal may alternatively be added to the current sensing signal instead of the reference signal.

Figure 5:
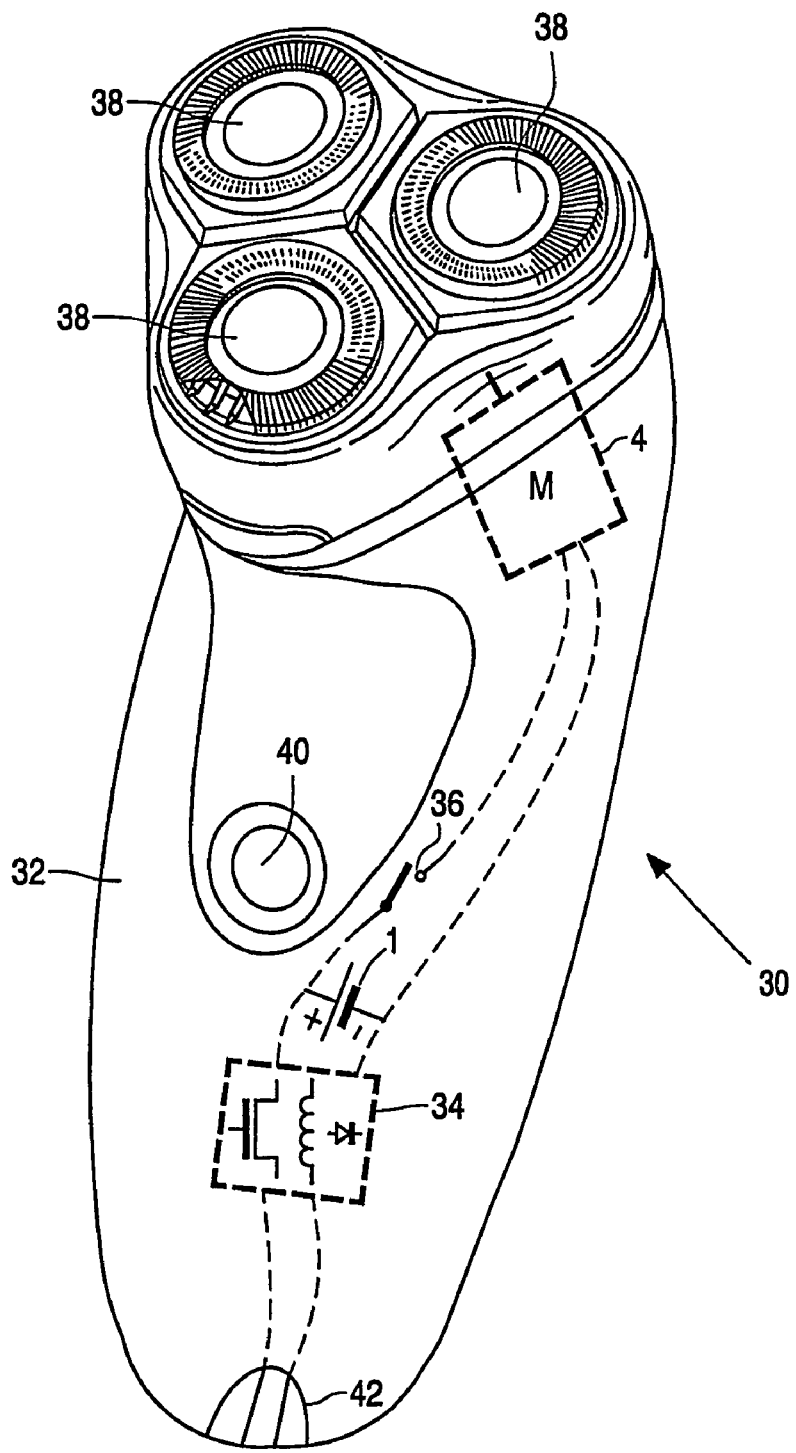
FIG. 5 shows an electric shaver comprising a switched mode power supply circuit in accordance with the invention.

The switched mode power supply is suitable for use, for example, in electrical appliances with rechargeable batteries which are charged from the mains voltage. FIG. 5 shows an electric shaver 30 having a housing 32 which accommodates a switched mode power supply 34 according to the invention for charging a rechargeable battery 1, and a motor 4 which can be connected to the battery 1 by means of a switch 36 as shown in FIG. 1. The motor 4 drives shaver heads 38 and the switch 36 is actuated by means of a push-button 40. The switched mode power supply may comprise a rectifier for rectifying AC mains voltage received through inlet 42, but it is also possible to rectify the mains AC voltage first in a separate AC mains adapter.

What is claimed is:

1. A switched mode power supply comprising:
   a controllable switch (9) for connecting and disconnecting an inductive element (7) to a power source (5) in response to a control signal;
   a current sensor (10) for sensing a current through the inductive element (7) and generating a sensing signal corresponding to the current;
   a reference generator (11) for generating a reference signal;
   a comparator (12) for comparing the sensing signal with the reference signal and generating the control signal; and
   a compensation circuit (14) operative on the reference generator (11) or the current sensor (10) for adjusting the reference signal or the sensing signal to compensate for delayed disconnecting of the inductive element (7) by the controllable switch (9) due to circuitry delay times,
wherein the compensation circuit comprises means (14) for correcting the reference signal or the sensing signal by means of a correction signal proportional to the gradient of the current through the inductive element (7).
   wherein the current sensor comprises a sensing resistor (17) connected in series with the inductive element (7), the sensing signal being a voltage across the sensing resistor (17), wherein the reference generator comprises a reference voltage source (18), the voltage of the reference voltage source being the reference signal, and wherein the compensation circuit comprises;
   a current mirror (19) having a current input terminal (20) and a current output terminal (21),
   a capacitor (16) coupling the voltage across the sensing resistor (17) to the current input terminal (20),
   a compensation resistor (15) in series with the reference voltage source (18),
   the current output terminal (21) being coupled to the compensation resistor (15) for causing a current flow through the compensation resistor (15) so as to form the correction signal.

2. A switched mode power supply as claimed in claim 1, wherein the compensation resistor (15) has a value R15, the capacitor (16) has a value (C16) and the current mirror (19) has a current gain G to effect a time constant (R15*C16*G) which is at least approximately equal to the circuitry delay times.

3. A Switched mode power supply as claimed in claim 1, also comprising a further capacitor (22) in parallel with the compensation resistor (15).

4. A switched mode power supply as claimed in claim 1, also comprising a further resistor (23) in series with the capacitor (16).

5. An electric shaver (30) comprising: a rechargeable battery (1), an electric motor (4), a switch (36) for connecting the motor (4) to the rechargeable battery (1), and a power-supply circuit (34) comprising:
   a controllable switch (9) for connecting and disconnecting an inductive element (7) to a power source (5) in response to a control signal;
   a current sensor (10) for sensing a current through the inductive element (7) and generating a sensing signal corresponding to the current;

a reference generator (11) for generating a reference signal;

a comparator (12) for comparing the sensing signal with the reference signal and generating the control signal; and a compensation circuit (14) operative on the reference generator (11) or the current sensor (10) for adjusting the reference signal or the sensing signal to compensate for delayed disconnecting of the inductive element (7) by the controllable switch (9) due to circuitry delay times, wherein the compensation circuit comprises means (14) for correcting the reference signal or the sensing signal by means of a correction signal proportional to the gradient of the current through the inductive element (7).

* * * * *